United States Patent
Cha et al.

(10) Patent No.: US 10,439,446 B2
(45) Date of Patent: Oct. 8, 2019

(54) APPARATUS FOR DETECTING FOREIGN OBJECT USING MOBILE LASER IN WIRELESS POWER TRANSFER SYSTEM OF ELECTRIC VEHICLE

(71) Applicants: HYUNDAI MOTOR COMPANY, Seoul (KR); KIA MOTORS CORPORATION, Seoul (KR); RESEARCH & BUSINESS FOUNDATION SUNGKYUNKWAN UNIVERSITY, Suwon-si, Gyeonggi-do (KR)

(72) Inventors: Jae Eun Cha, Gwangmyeong-si (KR); Gyu Yeong Choe, Suwon-si (KR); Woo Young Lee, Yongin-si (KR); Byoung Kuk Lee, Yongin-si (KR); Min Jung Kim, Suwon-si (KR); Min Kook Kim, Suwon-si (KR); Jong Eun Byun, Suwon-si (KR); Sang Joon Ann, Suwon-si (KR)

(73) Assignees: HYUNDAI MOTOR COMPANY, Seoul (KR); KIA MOTORS CORPORATION, Seoul (KR); RESEARCH & BUSINESS FOUNDATION SUNGKYUNKWAN UNIVERSITY, Suwon-si, Gyeonggi-do (KR)

(*) Notice: Subject to any disclaimer, the term of this patent is extended or adjusted under 35 U.S.C. 154(b) by 144 days.

(21) Appl. No.: 15/860,352

(22) Filed: Jan. 2, 2018

(65) Prior Publication Data
US 2018/0191204 A1    Jul. 5, 2018

(30) Foreign Application Priority Data

Jan. 3, 2017  (KR) .................. 10-2017-0000948
Nov. 30, 2017 (KR) .................. 10-2017-0163037

(51) Int. Cl.
*H02J 50/60*       (2016.01)
*G01V 8/18*        (2006.01)
(Continued)

(52) U.S. Cl.
CPC .............. *H02J 50/60* (2016.02); *B60L 53/12* (2019.02); *B60L 53/124* (2019.02); *B60L 53/31* (2019.02);
(Continued)

(58) Field of Classification Search
CPC .......... H02J 50/60; H02J 7/0025; H02J 50/12; H02J 7/025; B60L 53/12; B60L 53/60;
(Continued)

(56) References Cited

U.S. PATENT DOCUMENTS

2006/0109456 A1*  5/2006  Chou ................ G01N 21/47
                                                            356/237.3

\* cited by examiner

*Primary Examiner* — Robert L Deberadinis
(74) *Attorney, Agent, or Firm* — Morgan, Lewis & Bockius LLP

(57) ABSTRACT

A foreign object detection apparatus using a mobile laser in a wireless power transfer (WPT) system may comprise a laser transmitting part installed on one side of an upper portion of a transmission pad to generate a laser; a laser receiving part installed on an opposite side to the one side, and receiving the laser generated by the laser transmitting part; and a laser moving part for moving the laser transmitting part and the laser receiving part along the one side or the opposite side of the transmission pad.

17 Claims, 6 Drawing Sheets

(51) Int. Cl.
  *G01V 8/26* (2006.01)
  *B60L 53/12* (2019.01)
  *B60L 53/31* (2019.01)
  *B60L 53/60* (2019.01)
  *H02J 7/00* (2006.01)
  *B60L 53/124* (2019.01)
  *H02J 7/02* (2016.01)
  *H02J 50/12* (2016.01)

(52) U.S. Cl.
  CPC ............... *B60L 53/60* (2019.02); *G01V 8/18* (2013.01); *G01V 8/26* (2013.01); *H02J 7/0027* (2013.01); *H02J 7/025* (2013.01); *H02J 50/12* (2016.02)

(58) Field of Classification Search
  CPC ......... B60L 53/31; B60L 53/124; G01V 8/18; G01V 8/26
  See application file for complete search history.

APPARATUS FOR DETECTING FOREIGN OBJECT USING MOBILE LASER IN WIRELESS POWER TRANSFER SYSTEM OF ELECTRIC VEHICLE

CROSS-REFERENCE TO RELATED APPLICATION

The present application is based on and claims the benefit of priorities to Korean Patent Applications No. 10-2017-0000948 filed on Jan. 3, 2017 and No. 10-2017-0163037 filed on Nov. 30, 2017 with the Korean Intellectual Property Office, the entire contents of which are incorporated herein for all purposes by this reference.

TECHNICAL FIELD

The present disclosure relates to an apparatus for foreign object detection (FOD) using a mobile laser in a wireless power transfer (WPT) system, more particularly, to an apparatus for minimizing the size and number of laser apparatuses and enhancing FOD performance by using a mobile laser installed in a transmission pad of a WPT system to detect a foreign object between the transmission pad and a reception pad.

BACKGROUND

An electric vehicle (EV) charging system may basically be defined as a system for charging a high-voltage battery mounted on an EV by using power of an energy storage device or a power grid of a commercial power source. Such an EV charging system may have various forms according to a type of EV. For example, the EV charging system may be classified into a conductive type using a charging cable and a non-contact wireless power transfer (WPT) type (also referred to as an 'inductive type').

When charging the EV, a vehicle assembly (VA) (i.e., a reception pad in the VA) mounted on the EV makes an inductive resonance coupling with a transmission pad of the a ground assembly (GA) located in a charging station or a charging spot, and charges the battery in the EV using power transferred from the GA through the inductive resonance coupling.

The WPT system of the inductive type is a system that transmits electric power using a mutual electromagnetic induction phenomenon between the transmission pad (i.e., a transmission coil) and the reception pad (i.e., a reception coil). Accordingly, when there is a foreign object such as metallic or magnetic material between the transmission coil and the reception coil that can affect the magnetic field, the foreign object directly affects the resonant frequency of the WPT system, resulting in abnormal operation of the WPT system or decrease in efficiency of the WPT system. Also, temperature of the foreign object between the transmission coil and the reception coil may increase rapidly so that stability of the WPT system may be blighted. Therefore, a method for detecting a foreign object between a transmission coil and a reception coil is demanded.

SUMMARY

Embodiments of the present disclosure provide an apparatus for foreign objection detection using a mobile laser in a wireless power transfer system.

According to embodiments of the present disclosure, a foreign object detection apparatus using a mobile laser in a WPT system may comprise a laser transmitting part installed on one side of an upper portion of a transmission pad to generate a laser; a laser receiving part installed on an opposite side to the one side, and receiving the laser generated by the laser transmitting part; and a laser moving part for moving the laser transmitting part and the laser receiving part along the one side or the opposite side of the transmission pad.

The laser moving part may include a connection part that connects the laser transmitting part and the laser receiving part so that the laser transmitting part and the laser receiving part are moved together.

The laser moving part may include a conveying rail disposed parallel to the one side or the opposite side of the transmission pad on a lower portion of the transmission pad.

The laser moving part may move the laser transmitting part and the laser receiving part connected by the connection part along the conveying rail.

When the apparatus includes a plurality of laser transmitting parts and a plurality of laser receiving parts, the plurality of laser transmitting parts may be arranged on the one side at a first interval, and each of the plurality of laser receiving parts may be arranged on the opposite side by facing each of the plurality of laser transmitting parts. The first interval may be less than or equal to 21 mm.

When the apparatus includes a plurality of laser transmitting parts and a plurality of laser receiving parts, the plurality of laser transmitting parts and the plurality of laser receiving parts may be alternately arranged on the one side or the opposite side at a second interval.

When two pairs of laser transmitting parts and laser receiving parts are provided, each of the laser transmitting parts may be arranged as facing each of the plurality of laser receiving parts.

The laser moving part may move a first pair of the two pairs and a second pair of the two pairs in opposite directions.

The laser receiving part may include a sub foreign object detection circuit for detecting a foreign object by using a cadmium sulfide (CdS) sensor.

The sub foreign object detection circuit may include a first resistor connected to an applied voltage ($V_{CC}$) at one end of the first resistor and connected to the CdS sensor at another end of the first resistor; the CdS sensor connected to the first resistor at one end of the CdS sensor and connected to a ground at another end of the CdS sensor; and a buffer receiving a voltage between the first resistor and the CdS sensor as an input and outputting an output based on the input at a constant voltage level.

The first resistor may be at least ten times smaller than an initial internal resistance of the CdS sensor, and at least ten times greater than an internal resistance of the CdS sensor varied by sensing the laser.

The apparatus may further comprise a foreign object detection determining part determining whether the foreign object exists or not by referring to an output of the sub foreign object detection circuit.

The foreign object detection determining part may determine that a foreign object is detected when the output of the sub foreign object detection circuit is equal to an applied voltage within a tolerable error range.

The apparatus may further comprise, when a plurality of laser receiving parts exist, an OR gate which receives outputs of sub foreign object detection circuits, each of which is included in each of the plurality of laser receiving parts, and outputs a result signal of an OR operation on the outputs of the sub foreign object detection circuits.

The apparatus may further comprise a foreign object detection determining part determining whether the foreign object exists or not by referring to the result signal from the OR gate.

The foreign object detection determining part may be a ground assembly (GA) controller, and control an output power level of a GA coil included in the transmission pad according to a result of the determining whether a foreign object exists or not.

In the EV WPT system, using the foreign object detection apparatus according to the present disclosure, a foreign object between the transmission pad and the reception pad can be detected using a small number of laser transmitting/receiving elements. Also, since the laser is used, there is an advantage that both metallic object and non-metallic object can be detected.

Further, since the laser element for detecting a foreign object is prepared only in the transmission pad, the foreign object detection apparatus according to the present disclosure can be easily applied even if manufacturers of the transmission pad and the reception pad are different.

Figure 1:
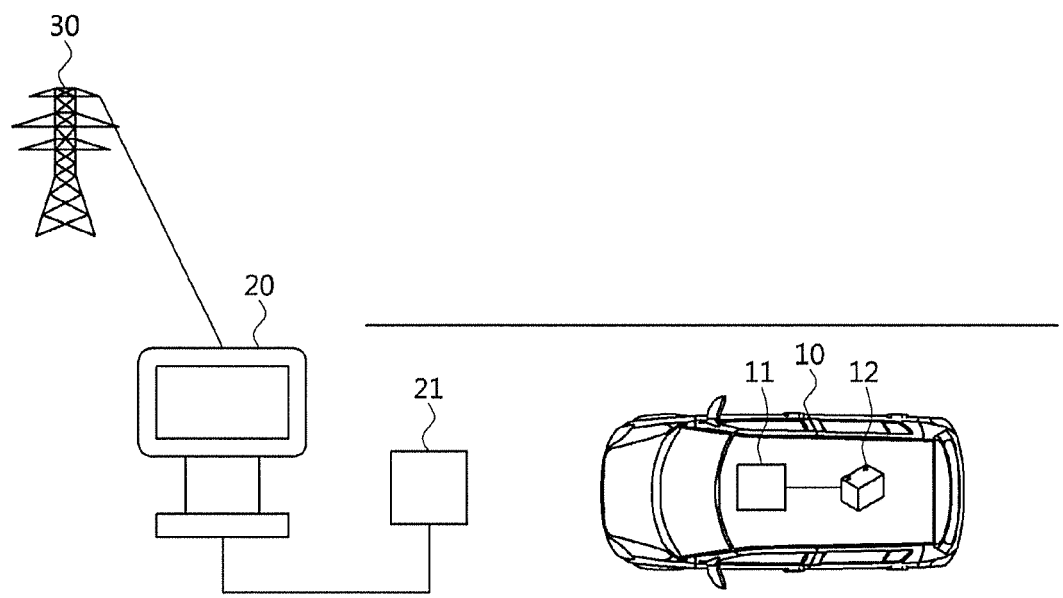
FIG. 1 is a conceptual diagram illustrating a concept of a wireless power transfer (WPT) to which an embodiment of the present disclosure is applied.

It may be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle, EV": An automobile, as defined in 49 CFR 523.3, intended for highway use, powered by an electric motor that draws current from an on-vehicle energy storage device including a battery, which is rechargeable from an off-vehicle source including residential or public electric service or an on-vehicle fuel powered generator. The EV may be four or more wheeled vehicle manufactured for use primarily on public streets or roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": A system for a wireless power transfer and control between the GA and VA including alignment and communications. This system transfers energy from the electric supply network to the electric vehicle electromagnetically through a two-part loosely coupled transformer.

"Wireless power transfer, WPT": A transfer of electrical power from an AC supply network to an electric vehicle by contactless means.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": A transformer formed by the coil in the GA Coil and the coil in the VA Coil that allows power to be transferred with galvanic isolation.

"Inductive coupling": Magnetic coupling between two coils. The "inductive coupling" in the present disclosure refers to a coupling between the GA Coil and the VA Coil.

"Ground assembly, GA'": An assembly on the infrastructure side including the GA Coil, a power/frequency conversion device and GA controller as well as the wiring from the grid and between each device, filtering circuits, housing(s) etc., necessary to function as the power source of wireless power charging system. The GA may include the communication elements necessary for communication between the GA and the VA.

"Vehicle assembly, VA": An assembly on the vehicle including the VA Coil, rectifier/power conversion device and VA controller as well as the wiring to the vehicle batteries and between each device, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be disposed in the EV. When the EV is receiving power, the secondary device may transfer the power from the primary to the EV. The secondary device may include the housing and all covers.

"GA controller": A portion of the GA that regulates the output power level to the GA Coil based on information from the vehicle.

"VA controller": A portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": A vertical distance between the plane of the higher of the top portion of the litz wire or the top portion of the magnetic material in the GA Coil to the plane of the lower of the bottom portion of the litz wire or the magnetic material in the VA Coil when aligned.

"Ambient temperature": A ground-level temperature of the air measured at the subsystem under consideration and not in direct sun light.

"Vehicle ground clearance": A vertical distance between the ground surface and the lowest part of the vehicle floor pan.

"Vehicle magnetic ground clearance": A vertical distance between the plane of the lower of the bottom portion of the litz wire or the magnetic material in the VA Coil mounted on a vehicle to the ground surface.

"VA Coil magnetic surface distance": A distance between the plane of the nearest magnetic or conducting component surface to the lower external surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of an electrical equipment (e.g., an electric vehicle) that may be touched. The conductive component may not be normally energized but may become energized in a case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": A communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited thereto.

"Low power excitation (LPE)": LPE means a technique of activating the primary device for the fine positioning ad pairing so that the EV can detect the primary device, and vice versa.

"Service set identifier (SSID)": SSID is a unique identifier including 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is a name of the network to which you want to connect. It is similar to SSID but can be a more extended concept.

"Basic service set identifier (BSSID)": BSSID including 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is disposed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus including the controller in conjunction with one or more other components, as would be appreciated by a person of ordinary skill in the art.

In an exemplary embodiment of the present disclosure, a "rapid charging" may refer to a method of directly converting AC power of a power system to DC power, and supplying the converted DC power to a battery mounted on an EV. Here, a voltage of the DC power may be DC 500 volts (V) or less.

In an exemplary embodiment of the present disclosure, a "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. Here, the EV may further include an on-board charger (OBC) which is a device configured for boosting the AC power for the slow charging, converting the AC power to DC power, and supplying the converted DC power to the battery.

Hereinafter, embodiments according to an exemplary embodiment of the present disclosure will be explained in detail by referring to accompanying figures.

FIG. 1 is a conceptual diagram illustrating a concept of a wireless power transfer (WPT) to which an embodiment of the present disclosure is applied.

Referring to FIG. 1, a wireless power transfer (WPT) may be performed by at least one component of an electric vehicle (EV) 10 and a charging station 20, and may be used for wirelessly transferring power to the EV 10.

Here, the EV 10 may be usually defined as a vehicle supplying an electric power stored in a rechargeable energy storage including a battery 12 as an energy source of an electric motor which is a powertrain system of the EV 10.

The EV 10 according to an exemplary embodiment of the present disclosure may include a hybrid electric vehicle (HEV) having an electric motor and an internal combustion engine together, and may include not only an automobile but also a motorcycle, a cart, a scooter, and an electric bicycle.

Further, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

The charging station 20 may be connected to a power grid 30 or a power backbone, and may provide an alternating current (AC) power or a direct current (DC) power to a power transmission pad 21 including a transmission coil through a power link.

Further, the charging station 20 may communicate with an infrastructure management system or an infrastructure server that manages the power grid 30 or a power network through wired/wireless communications, and performs wireless communications with the EV 10.

Here, the wireless communications may be Bluetooth, Zigbee, cellular, wireless local area network (WLAN), or the like.

The charging station 20 may be located at various places including, for example, a parking area attached to the owner's house of the EV 10, a parking area for charging an EV at a gas station, a parking area at a shopping center or a workplace.

A process of wirelessly charging the battery 12 of the EV 10 may begin with placing the power reception pad 11 of the EV 10 in an energy field generated by the power transmission pad 21 of the charging station 20, and making the reception coil and the transmission coil be interacted or coupled to each other. An electromotive force may be induced in the power reception pad 11 as a result of the interaction or coupling, and the battery 12 may be charged by the induced electromotive force.

The charging station 20 and the power transmission pad 21 may be referred to as a ground assembly (GA) in whole or in part, where the GA may refer to the previously defined meaning.

All or part of the internal components and the power reception pad 11 of the EV 10 may be referred to as a vehicle assembly (VA), which may refer to the previously defined meaning.

Here, the power transmission pad 21 or the power reception pad 11 may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

Figure 2:
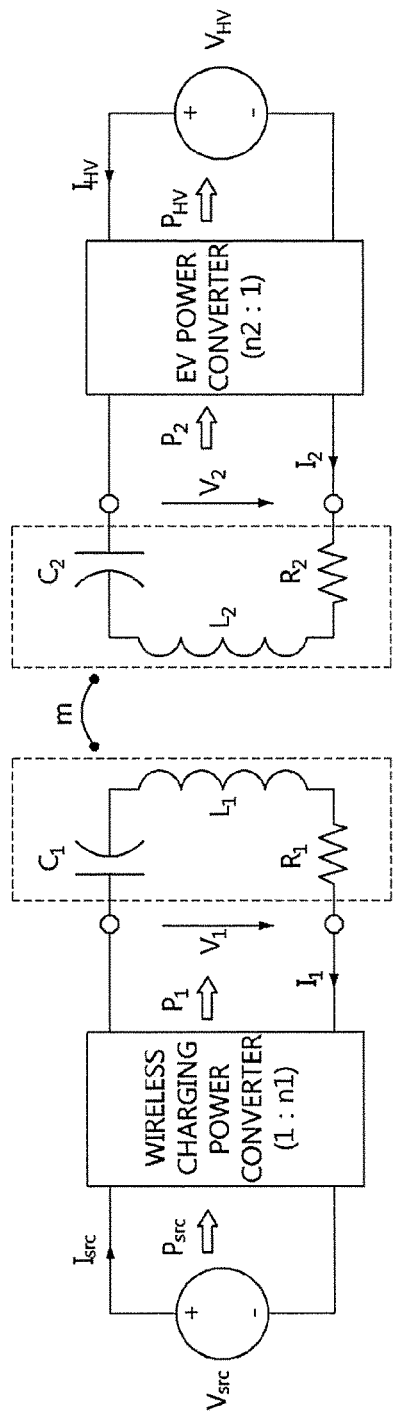
FIG. 2 is a conceptual diagram illustrating a wireless power transfer circuit according to an embodiment of the present disclosure.

FIG. 2 is a conceptual diagram illustrating a wireless power transfer circuit according to an exemplary embodiment of the present disclosure.

Referring to FIG. 2, a schematic configuration of a circuit in which a wireless power transfer is performed in an EV WPT system may be seen.

The left-hand side of FIG. 2 may be interpreted as expressing all or part of a power source $V_{src}$ supplied from the power network, the charging station 20, and the power transmission pad 21 in FIG. 1, and the right side of FIG. 2 may be interpreted as expressing all or part of the EV 10 including the power reception pad 11 and the battery 12.

First, the circuit of the left-hand side of FIG. 2 may provide an output power $P_{src}$ corresponding to the power source supplied from the power network to a wireless charging power converter. The wireless charging power converter may supply an output power $P_1$ converted from the output power $P_{src}$ through frequency-converting and AC-to-DC converting to generate an electromagnetic field at a desired operating frequency in a transmission coil $L_1$.

Specifically, the wireless charging power converter may include an AC/DC converter for converting the power Psrc which is an AC power supplied from the power network into a DC power, and a low frequency (LF) converter for converting the DC power into a DC power having an operating frequency suitable for wireless charging. For example, the operating frequency for wireless charging may be determined to be within 80 to 90 kHz.

The power $P_1$ output from the wireless charging power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$.

Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to an EV power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The EV power converter may include an LF/DC converter that converts the supplied power $P_2$ of a specific operating frequency to a DC power having a voltage level suitable for the battery $V_{HV}$ of the EV 10.

The electric power $P_{HV}$ converted from the power $P_2$ supplied to the EV power converter may be output, and the power $P_{HV}$ may be used for charging the battery $V_{HV}$ disposed in the EV 10.

The circuit of the right-hand side of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

The circuit of FIG. 2 should be understood as an illustrative circuit for wireless power transfer in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

Here, the transmission coil $L_1$ may be included in the power transmission pad 21 in FIG. 1, and the reception coil $L_2$ may be included in the power reception pad 11 in FIG. 1. Therefore, positioning between the power transmission pad 21 and the power reception pad 11 or positioning between the EV 10 and the power transmission pad 21 will be described below with reference to the drawings.

Figure 3:
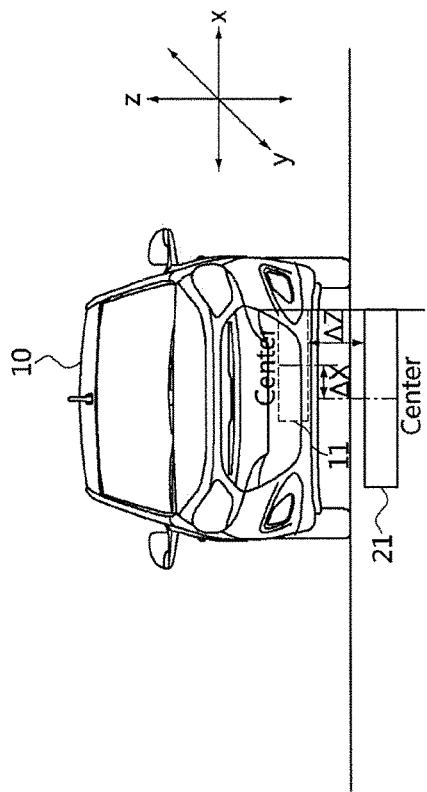
FIG. 3 is a conceptual diagram for explaining a concept of alignment in an EV wireless power transfer according to an embodiment of the present disclosure.

FIG. 3 is a conceptual diagram for explaining a concept of alignment in an EV wireless power transfer according to an exemplary embodiment of the present disclosure.

Referring to FIG. 3, a method of aligning the power transmission pad 21 and the power reception pad 11 in the EV 10 in FIG. 1 will be described. Here, a positional alignment may correspond to the alignment, which is the above-mentioned term, and thus may be defined as a positional alignment between the GA and the VA, but is not limited to the alignment of the power transmission pad and the power reception pad.

Although the power transmission pad 21 is illustrated as positioned below a ground surface as shown in FIG. 3, the power transmission pad 21 may also be positioned on the ground surface, or positioned such that a top portion surface of the power transmission pad 21 is exposed below the ground surface.

The power reception pad 11 of the EV 10 may be defined by different categories according to its heights (defined in the z direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the power reception pad may support a part of the above-described classes 1 to 3. For example, only the class 1 may be supported according to the type of the power reception pad 11, or the class 1 and 2 may be supported according to the type of the power reception pad 11.

Here, the height of the power reception pad 11 measured from the ground surface may correspond to the previously defined term 'vehicle magnetic ground clearance'.

Further, the position of the power transmission pad 21 in the height direction (i.e., defined in the z direction) may be determined to be located between the maximum class and the minimum class supported by the power reception pad 11. For example, when the power reception pad 11 supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the width and longitudinal directions (defined in the x and y directions). For example, it may be determined to be located within ±75 mm in the width direction (defined in the x direction), and within ±100 mm in the longitudinal direction (defined in the y direction).

Here, the relative positions of the power transmission pad 21 and the power reception pad 11 may be varied in accordance with their experimental results, and the numerical values should be understood as exemplary.

Figure 4:
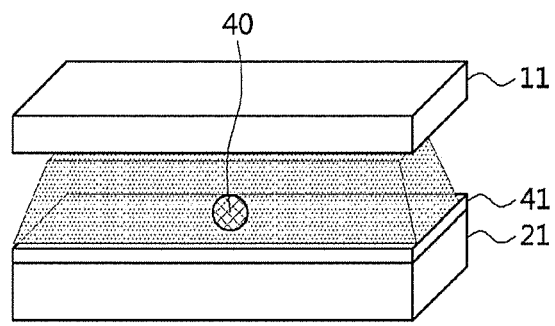
FIG. 4 is a schematic diagram illustrating a foreign object detection apparatus using a light source in an EV WPT system.
Figure 5:
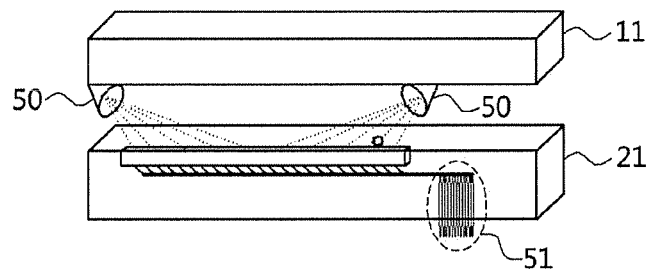
FIG. 5 is a detailed diagram illustrating a foreign object detection apparatus using a light source according to the embodiment of FIG. 4.

FIG. 4 is a schematic diagram illustrating a foreign object detection apparatus using a light source in an EV WPT system, and FIG. 5 is a detailed diagram illustrating a foreign object detection apparatus using a light source according to the embodiment of FIG. 4.

Referring to FIG. 4 and FIG. 5, a light source may be used as a means for detecting a foreign object between the power transmission pad 21 and the power reception pad 11.

Referring to FIG. 4, when light is applied to the power transmission pad 21 using a light source provided on the power reception pad 11 mounted on an EV, a foreign object 40 between the power transmission pad 21 and the power reception 11 pad may be detected. In this case, the power transmission pad 21 may be provided with an optical cable plate 41 capable of receiving the light, and if the amount of light detected through the installed optical cable plate 41 is reduced, a foreign object may be determined to exist.

Referring to FIG. 5, a light source 50 may be installed on the power reception pad 11 as shown in FIG. 5, and the power transmission pad 21 may be irradiated with the light by the installed light source 50. Here, it may be advantageous that a process of detecting the irradiated light is performed outside the power transmission pad 21 so that the process of detecting the irradiated light does not affect a magnetic field formed between the power transmission pad 21 and the power reception pad 11. Therefore, the light irradiated to the power transmission pad 21 may be guided to the outside of the power transmission pad 21 using an optical fiber cable 51, and the light guided to the outside of the power transmission pad 21 may be detected using an optical sensor.

The detection of a foreign object using a light source is advantageous in that it can detect both a metallic object and a non-metallic object with relatively simple operation principle. However, the light source should be attached to the EV, and thus the range of light irradiation may be changed according to the position of the EV.

Figure 6A:
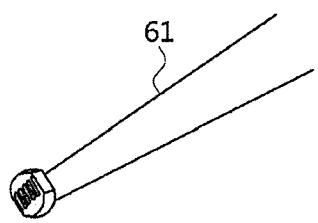
FIG. 6A is an illustrative view showing appearance of a cadmium sulfide (CdS) sensor used in a foreign object detection apparatus according to an embodiment of the present disclosure.
Figure 6B:
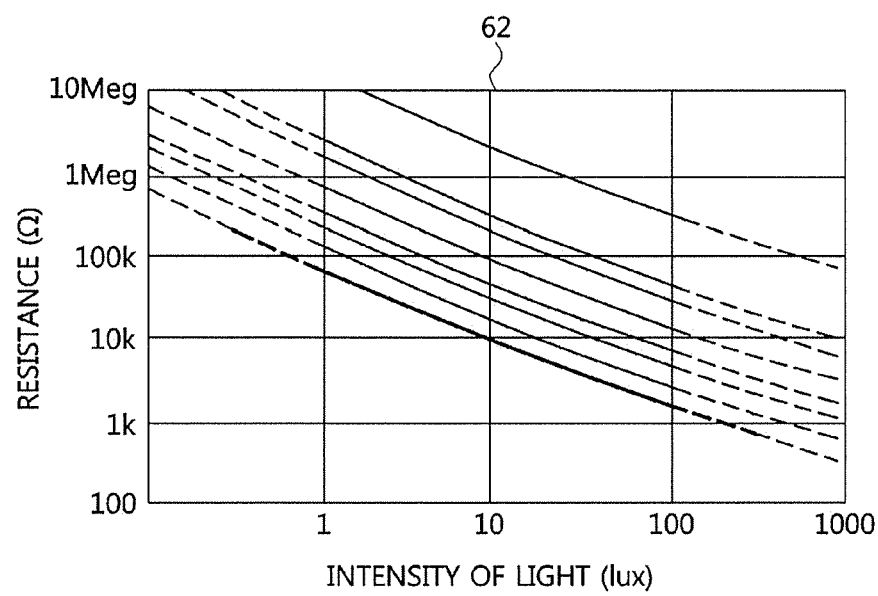
FIG. 6B is a graph for explaining characteristics of a CdS sensor used in a foreign object detection apparatus according to an embodiment of the present disclosure.

FIG. 6A is an illustrative view showing appearance of a cadmium sulfide (CdS) sensor used in a foreign object detection apparatus according to an embodiment of the present disclosure, and FIG. 6B is a graph for explaining characteristics of a CdS sensor used in a foreign object detection apparatus according to an embodiment of the present disclosure.

In the present disclosure, a CdS sensor 61 may be used as the optical sensor for detecting the light source according to the embodiment of FIG. 5. The CdS sensor 61 is a photoconductive element whose main component is cadmium sulfide, and is a photo resistor whose resistance value changes according to the intensity of light.

Referring to FIG. 6A, the external shape of the CdS sensor 61 may be identified. The CdS sensor 61 may be composed of a sealed container containing CdS, a light-receiving window made of transparent plastic or glass on the outside of the sealed container, and two lead wires extending out of the sealed container. Here, when light enters the light-receiving window of the CdS sensor 61, the resistance of the CdS sensor 61 may be reduced by the illumination, and a current flowing through the CdS sensor 61 may increase.

Referring to FIG. 6B, a graph 62 illustrates the resistance value of the CdS sensor 61 according to the intensity of light (lux). Here, the resistance value representing the y-axis is shown in a logarithm scale.

Referring to the graph 62, it may be seen that the resistance value of the CdS sensor 61 decreases as the intensity of light increases, and increases as the intensity of light decreases as described above. That is, the CdS sensor 61 has characteristics such that light intensity and resistance are inversely proportional to each other. The CdS sensor 61 may be used in an apparatus for turning on or off light according to illuminance of a room, an illuminance measuring circuit, and the like.

Meanwhile, although the optical sensor according to FIG. 6 has been described by taking the CdS sensor 61 as an example, cadmium selenide (CdSe) may also be used depending on the material of the resistor which generates a resistance difference according to the illuminance, and a material into which CdS and CdSe are mixed at a certain ratio may also be used.

Figure 7:
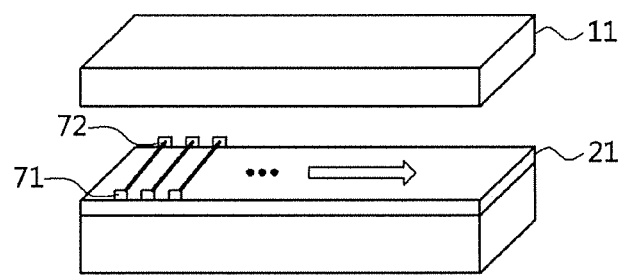
FIG. 7 is a conceptual diagram illustrating a foreign object detection apparatus using a laser.

FIG. 7 is a conceptual diagram illustrating a foreign object detection apparatus using a laser.

Referring to FIG. 7, in the EV WPT system, a foreign object detection apparatus using a laser may comprise a laser transmitting part 71 and a laser receiving part 72 provided on an upper portion of the power transmission pad 21. Here, the laser transmitting part 71 may include a laser generating module for generating a laser, and the laser receiving part 72 may include a laser or a light sensing sensor. For example, the laser receiving part 72 may include a CdS sensor described above. Also, the laser receiving part 72 may include a foreign object detection circuit for detecting presence or absence of a foreign object by sensing the received laser. At least one or more of the laser transmitting part 71 and the laser receiving part 72 may be installed on one side and the other side of the power transmission pad 21. For example, the laser transmitting part 71 and the laser receiving part 72 may be symmetrically installed at positions facing each other as shown in FIG. 7.

Specifically, when there is no foreign object between the power transmission pad 21 and the power reception pad 11, the laser generated in the laser transmitting part 71 may directly reach the corresponding laser receiving part 72, and the internal resistance value of the CdS sensor included in the laser receiving part 72 may be reduced.

Conversely, when a foreign object exists between the power transmission pad 21 and the power reception pad 11, the laser generated by the laser transmitting part 71 may not reach the corresponding laser receiving part 72 due to blocking of the foreign object. Accordingly, the internal resistance value of the CdS sensor included in the laser receiving part 72 may be increased. That is, by checking whether the internal resistance of the CdS sensor is increased or decreased, a foreign object between the power transmission pad 21 and the power reception pad 11 may be detected.

Meanwhile, in the case of configuring the foreign object detection apparatus using a laser as shown in FIG. 7, a plurality of pairs of the laser transmitting part 71 and the laser receiving part 72 should be provided. In order to detect a small foreign object, the distances between the pairs of the laser transmitting part and the laser receiving part should be shortened. For example, the distance between the first pair of the laser transmitting and receiving parts and the second pair of the laser transmitting and receiving parts adjacent to the first pair may be 21 mm or less so that a 5 cent coin can be detected as a foreign object.

Further, since the laser transmitting part 71 requires a laser generating module and the laser receiving part 72 requires a circuit for detecting the laser, when the number of the laser transmitting and receiving parts is large, cost and installation area for them may be remarkably increased. Hereinafter, an apparatus for detecting a foreign object by minimizing the number of the laser transmitting parts and the laser receiving parts will be proposed.

Figure 8:
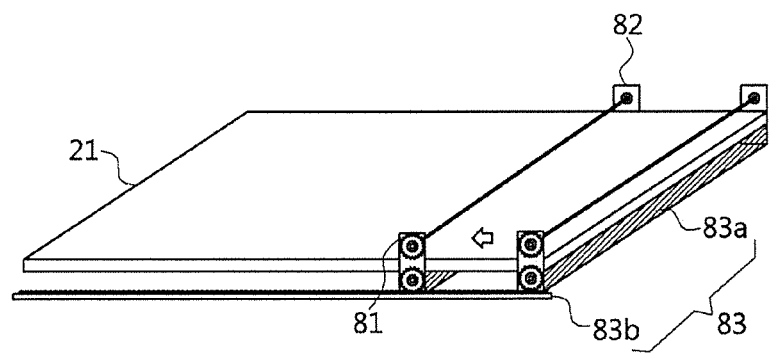
FIG. 8 is a conceptual diagram illustrating a foreign object detection apparatus using a mobile laser according to an embodiment of the present disclosure.

FIG. 8 is a conceptual diagram illustrating a foreign object detection apparatus using a mobile laser according to an embodiment of the present disclosure.

Referring to FIG. 8, the foreign object detection apparatus using a mobile laser may comprise a laser transmitting part 81, a laser receiving part 82, and a laser moving part 83. The laser transmitting part 81 may include a laser generating module installed on one side of an upper portion of the power transmission pad 21 to generate a laser. Here, the laser transmitting part 81 may include a laser generating module as well as a light emitting device for generating light.

The laser receiving part 82 may be provided on the other side opposite to the laser transmitting part 81 and may be capable of receiving the laser generated by the laser transmitting part 81 and detecting the intensity of the received laser. For example, the laser receiving part 82 may include a cadmium sulfide (CdS) sensor, and/or a foreign object detection circuit for determining whether or not a foreign object is detected.

The laser moving part 83 may move the laser transmitting part 81 and the laser receiving part 82 along the one side or the opposite side of the transmission pad 21. That is, the foreign object detection apparatus according to the present disclosure may move the laser transmitting part 81 and the laser receiving part 82 by using the laser moving part 83 so that detection of a foreign object is made possible by using only a small number of the laser transmitting and receiving parts (even by using only a pair of laser transmitting and receiving parts).

The laser moving part 83 may include a connection part 83*a* that connects the laser transmitting part 81 and the laser receiving part 82 so that the laser transmitting part 81 and the laser receiving part 82 can be moved together. Also, the laser moving part 83 may include a conveying rail 83*b* disposed parallel to the one side or the opposite side of the transmission pad 21 on a lower portion of the one side and the opposite side of the transmission pad 21. Thus, the laser moving part 83 may move the laser transmitting part 81 and the laser receiving part 82 connected by the connection part 83*a* along the conveying rail 83*b* at a preset speed.

On the other hand, when there are a plurality of laser transmitting parts and a plurality of laser receiving parts, the plurality of laser transmitting parts may be arranged at the one side of the transmission pad 21 at a first interval, and each of the plurality of laser receiving parts may be arranged at the opposite side of the transmission pad 21 by facing the corresponding laser transmitting part. Here, the first interval may be less than or equal to 21 mm.

Alternatively, when there are a plurality of laser transmitting parts and a plurality of laser receiving parts, the plurality of laser transmitting parts and the plurality of laser receiving parts may be alternately arranged on the one side or the opposite side at a second interval. More specifically, a part of the plurality of laser transmitting and receiving parts may be alternately arranged on one side of the transmission pad 21, the remaining laser receiving parts may be arranged on the opposite side by facing the corresponding laser transmitting parts, and the remaining laser transmitting parts may be arranged on the opposite side by facing the corresponding laser receiving parts.

Meanwhile, at least one pair of laser transmitting part and laser receiving part may be installed on the upper portion of the transmission pad 21. However, when only a single pair of laser transmitting part and laser receiving part is installed, the entire transmission pad 21 should be scanned by moving the single pair of laser transmitting part and laser receiving part over the entire transmission pad 21, so that the FOD performance may be degraded if the moving speed is low.

Therefore, when two pairs of laser transmitting part and laser receiving part are provided on the transmission pad 21, the laser moving part 83 may move the first pair and the second pair in opposite directions. That is, by simultaneously moving the first pair and the second pair in opposite directions, each pair can move a smaller distance than in the above-described case of using only one pair. Here, the first pair and the second pair may be moved in opposite directions from the center of the transmission pad, or may be moved toward the center of the transmission pad from both ends of the transmission pad.

Thus, the foreign object detection apparatus according to the embodiment of FIG. 8 can achieve the same detection effect as that of the foreign object detection apparatus according to the embodiment of FIG. 7, by using a small number of laser transmitting parts and laser receiving parts (even a single pair).

Here, laser generated by a laser transmitting part is generally received by a corresponding laser receiving part located opposite to the laser transmitting part, but embodiments of the present disclosure are not limited thereto. For example, laser generated by a laser transmitting part may be received by a laser receiving part located in a diagonal direction of the laser transmitting part.

Figure 9:
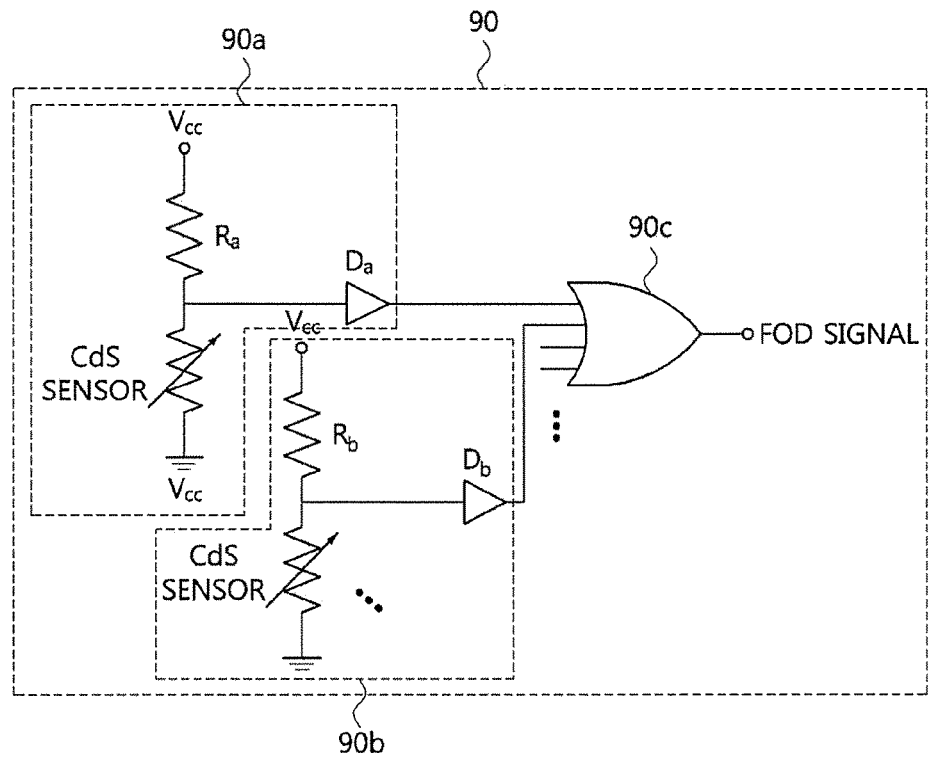
FIG. 9 is a circuit diagram illustrating an example of a foreign object detection circuit included in a foreign object detection apparatus according to an embodiment of the present disclosure.

FIG. 9 is a circuit diagram illustrating an example of a foreign object detection circuit included in a foreign object detection apparatus according to an embodiment of the present disclosure.

Referring to FIG. 9, a foreign object detection circuit 90 included in the foreign object detection apparatus may comprise sub foreign object detection circuits 90*a* and 90*b* included in the laser receiving part 83, and an OR gate 90*c*

(e.g., a digital logic gate) which receives outputs of the sub foreign object detection circuits 90a and 90b, performs an OR operation on the outputs, and outputs a result of the OR operation. Here, although two sub foreign object detection circuits 90a and 90b are shown in FIG. 9, as many sub foreign object detection circuits as corresponding to the number of the laser receiving parts may exist. For example, FIG. 9 illustrates an example in which there are two laser receiving parts and two sub foreign object detection circuits corresponding to the two laser receiving parts.

Specifically, in each of the sub foreign object detection circuits 90a and 90b provided in the laser receiving part, a first resistor (e.g., $R_a$ or $R_b$) and a CdS sensor (i.e., an internal resistance of the CdS sensor) may be connected in series to an applied voltage $V_{CC}$ (e.g., 5V) and a ground (or, virtual ground). Also, there may be a buffer (e.g., $D_a$ or $D_b$) which detects a voltage between the first resistor and the CdS sensor as an input and outputs the voltage at a constant voltage level. That is, the output of the buffer (e.g., $D_a$ or $D_b$) may be an output of each of the sub foreign object detection circuits 90a and 90b.

Here, the buffers $D_a$ and $D_b$ may be referred to as voltage buffers. The buffers may be replaced by filters or amplifiers, or omitted in some cases.

If a foreign object detection apparatus is constituted by a plurality of laser transmitting parts and a plurality of laser receiving parts as shown in FIG. 7, since the plurality of laser receiving parts exist, a plurality of inputs may be used as inputs to the OR gate 90c as shown in FIG. 9. However, if only one laser receiving part is used as shown in FIG. 8, it may be possible to determine whether or not a foreign object is detected by only the output of one sub-foreign object detection circuit without the OR gate 90c.

Here, the internal resistance of the CdS sensor may vary from several ohms to several hundreds of kilo-ohms depending on the illuminance. That is, since the internal resistance of the CdS sensor included in the sub foreign object detection circuits 90a and 90b is relatively small as compared with the first resistors $R_a$ and $R_b$ when the laser reaches the laser receiving part because no foreign matter is detected, the voltage across the sensor's internal resistance may be very small. Accordingly, a voltage value indicating '0' of the OR operation may be transmitted to the input of the OR gate 90c. Here, the voltage value indicating '0' may mean a voltage within a predetermined error range from '0'.

On the other hand, if a foreign object is detected and the laser does not reach the laser receiving part, the internal resistance of the CdS sensor included in the sub foreign object detection circuits 90a and 90b may be high, so that the voltage applied to the internal resistance of the CdS sensor may also be high. Therefore, a voltage value indicating '1' of the OR operation may be transmitted to the input of the OR gate 90c. Here, the voltage value of '1' may mean a voltage within a predetermined error range from the applied voltage (i.e., $V_{CC}$) or a predetermined voltage. Specifically, if the internal resistance of the CdS sensor becomes significantly higher than that of the first resistors $R_a$ and $R_b$, the voltage across the first resistors $R_a$ and $R_b$ becomes negligibly small. Therefore, the voltage applied to the CdS sensor may be equal to the applied voltage $V_{CC}$.

Therefore, a voltage magnitude of a foreign object detection signal (i.e., FOD signal), which is the output of the foreign object detection circuit 90 of FIG. 9, may change depending on presence or absence of a foreign object, and the FOD signal may be transmitted to a WPT control apparatus so that the WPT control apparatus can stop or control WPT for an EV based on the FOD signal.

Figure 10:
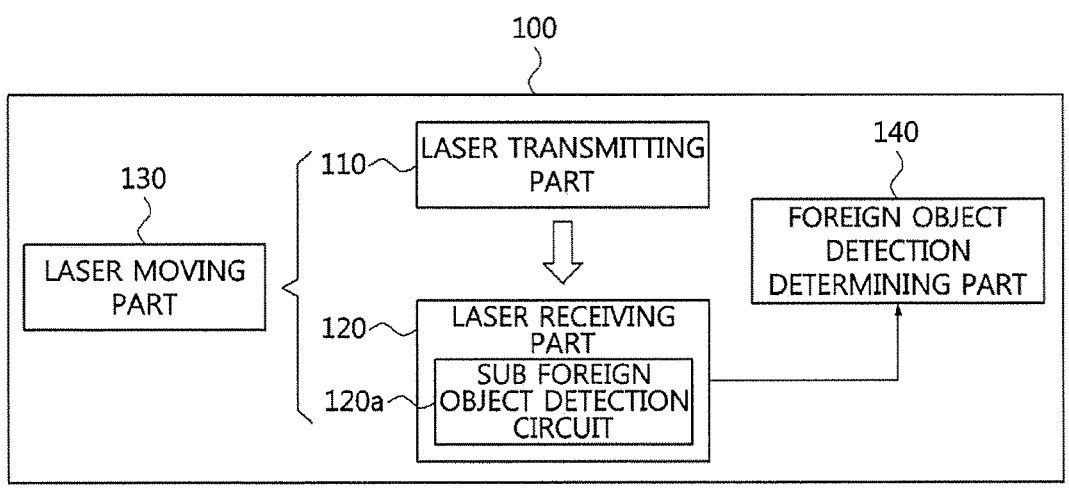
FIG. 10 is a configuration diagram illustrating a foreign object detection apparatus according to an embodiment of the present disclosure.

FIG. 10 is a configuration diagram illustrating a foreign object detection apparatus according to an embodiment of the present disclosure.

Referring to FIG. 10, the foreign object detection apparatus 100 for detecting a foreign object using a mobile laser in an EV WPT system may comprise a laser transmitting part 110 installed on one side of an upper portion of a transmission pad to generate a laser, a laser receiving part 120 installed on the opposite side of the upper portion of the transmission pad to receive the laser generated by the laser transmitting part, and a laser moving part 130 for moving the laser transmitting part 110 and the laser receiving part 120 along the one side or the opposite side.

The laser moving part 130 may include a connection part that connects the laser transmitting part 110 and the laser receiving part 120 so that the laser transmitting part 110 and the laser receiving part 120 can be moved together. Also, the laser moving part 130 may include a conveying rail disposed parallel to the one side or the opposite side of the transmission pad 21 on the lower portion of the one side and the opposite side of the transmission pad 21. Thus, the laser moving part 130 may move the laser transmitting part 110 and the laser receiving part 120 connected by the connection part along the conveying rail at a preset speed.

When there are a plurality of laser transmitting parts and a plurality of laser receiving parts, the plurality of laser transmitting parts may be arranged at the one side of the transmission pad 21 at a first interval, and each of the plurality of laser receiving parts may be arranged at the opposite side of the transmission pad 21 by facing the corresponding laser transmitting part. Here, the first interval may be less than or equal to 21 mm.

Alternatively, when there are a plurality of laser transmitting parts and a plurality of laser receiving parts, the plurality of laser transmitting parts and the plurality of laser receiving parts may be alternately arranged at the one side or the opposite side at a second interval.

Further, when two pairs of laser transmitting part and laser receiving part are provided on the transmission pad 21, the laser moving part 83 may move the first pair and the second pair in opposite directions.

The laser receiving part 120 may include a sub foreign object detection circuit 120a for detecting a foreign object using a CdS sensor. Also, the sub foreign object detection circuit 120a may include a first resistor which is connected to the applied voltage $V_{CC}$ at one end and connected to the CdS sensor at the other end, and a buffer that receives a voltage between the first resistor and the CdS sensor as an input and outputs the voltage at a constant voltage level. The first resistor may be at least ten times smaller than an initial internal resistance of the CdS sensor, and at least ten times greater than the internal resistance of the CdS sensor varied by sensing the laser.

The foreign object detection apparatus 100 may further include a foreign object detection determining part 140 for determining whether a foreign object is detected by referring to the output of the sub foreign object detection circuit 120a.

The foreign object detection apparatus 100 may include a plurality of laser receiving parts. In this case, the foreign object detection apparatus 100 may further include an OR gate for receiving an output of the sub foreign object detecting circuit 120a included in each of the plurality of laser receiving parts 130 and performing an OR operation for outputting a result of the OR operation. Here, the foreign object detection apparatus 100 may further include a foreign object detection determining part 140 for determining whether a foreign object is detected by referring to an output value of the OR gate.

If the output value of the sub foreign object detection circuit 120a is equal to the applied voltage within a tolerance range, the foreign object detection determining part 140 may determine that a foreign object is detected. On the other hand, if the output value of the sub foreign object detection circuit 120a is equal to '0' within a tolerance range, the foreign object detection determining part 140 may determine that a foreign object is not detected.

Here, the foreign object detection determining part 140 may be a GA controller and may adjust the output power level of the GA coil in the transmission pad according to the presence or absence of the foreign object.

Figure 11:
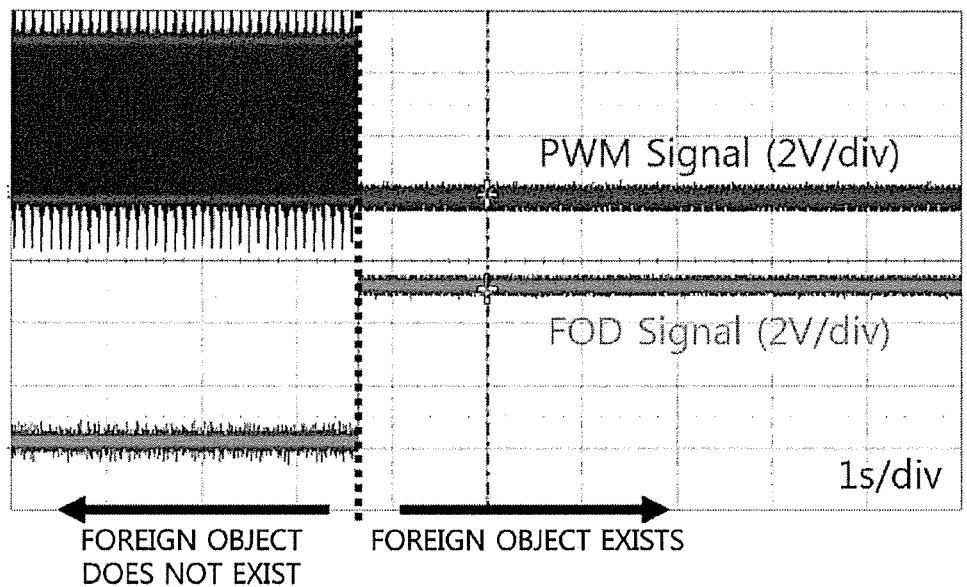
FIG. 11 is a graph showing a result of a foreign object detection experiment using the foreign object detection circuit according to the embodiment of the present disclosure.

FIG. 11 is a graph showing a result of a foreign object detection experiment using the foreign object detection circuit according to the embodiment of the present disclosure.

Referring to FIG. 11, when a pulse width modulation (PWM) signal and the FOD signal are set to 2V/div and sec/div is set to 1 sec/div, each signal output waveform may be shown according to whether a foreign object exists or not. Here, the PWM signal is a signal for controlling WPT, and may be a signal applied to a circuit to initiate or stop the WPT. More specifically, when the WPT from the transmission pad to the reception pad is performed, the PWM signal applied to the circuit may be generated, and when the WPT is stopped, the PWM signal may be interrupted. The FOD signal may be the output of the foreign object detection circuit according to FIG. 9.

According to the graph of FIG. 11, the FOD signal is outputted as 0 V when there is no foreign object, and the FOD signal is changed to $V_{CC}$ (e.g., 5V) when a foreign object is detected. A controller (e.g., a digital signal processor (DSP)) of the foreign object detection apparatus may prevent wireless power from being transmitted to the reception pad by blocking the PWM signal. Here, the controller may correspond to the foreign object detection determining part according to FIG. 10, and may be referred to as a GA controller or may be included in a GA controller.

Figure 12:
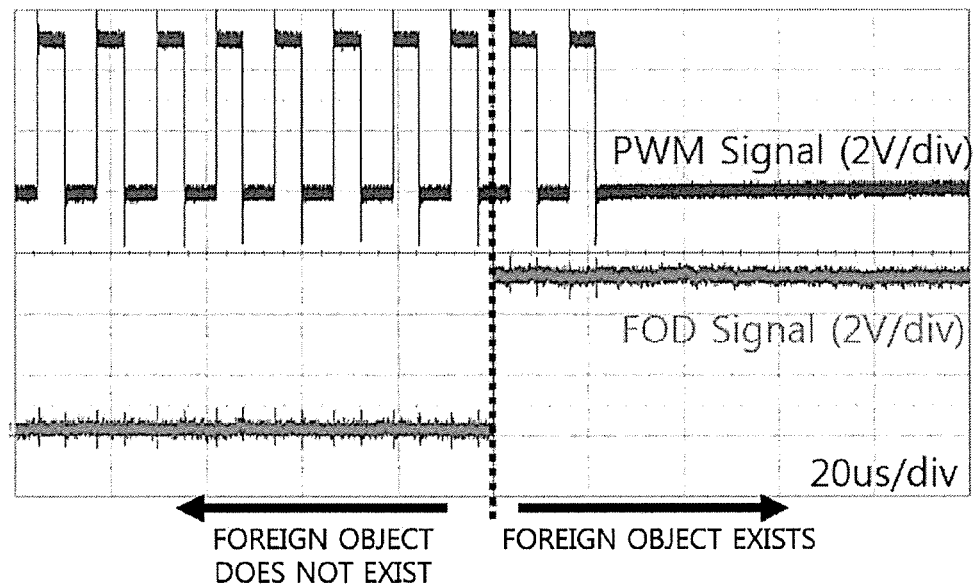
FIG. 12 is an enlarged graph of the graph of FIG. 11.

FIG. 12 is an enlarged graph of the graph in FIG. 11.

Referring to FIG. 12, in the same situation as described with reference to FIG. 11, a display unit of the graph is set to 20 μs/div so that the signal output waveform can be confirmed in more detail. It may be confirmed that the FOD signal is generated and then the PWM signal is generated after a lapse of some time (about 20 μs on the graph) from the generation of the FOD signal.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present disclosure or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present disclosure, and vice versa.

While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments, a programmable logic device (e.g., a field programmable gate array (FPGA)) may be used to perform some or all of the functions of the methods described herein. In embodiments, the FPGA may operate in conjunction with a microprocessor to perform one of the methods described herein. Generally, the methods are preferably performed by some hardware device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present disclosure, as well as various alternatives and modifications thereof. It is intended that the scope of the disclosure be defined by the Claims appended hereto and their equivalents.

What is claimed is:

1. A foreign object detection apparatus using a mobile laser in a wireless power transfer (WPT) system, the apparatus comprising:
    a laser transmitting part installed on one side of an upper portion of a transmission pad to generate a laser;
    a laser receiving part installed on an opposite side to the one side, and receiving the laser generated by the laser transmitting part; and
    a laser moving part for moving the laser transmitting part and the laser receiving part along the one side or the opposite side of the transmission pad.

2. The foreign object detection apparatus according to claim 1, wherein the laser moving part includes a connection part that connects the laser transmitting part and the laser receiving part so that the laser transmitting part and the laser receiving part are moved together.

3. The foreign object detection apparatus according to claim 2, wherein the laser moving part includes a conveying rail disposed parallel to the one side or the opposite side of the transmission pad on a lower portion of the transmission pad.

4. The foreign object detection apparatus according to claim 3, wherein the laser moving part moves the laser transmitting part and the laser receiving part connected by the connection part along the conveying rail.

5. The foreign object detection apparatus according to claim 1, wherein, when the apparatus includes a plurality of laser transmitting parts and a plurality of laser receiving parts, the plurality of laser transmitting parts are arranged on the one side at a first interval, and each of the plurality of laser receiving parts is arranged on the opposite side by facing each of the plurality of laser transmitting parts.

6. The foreign object detection apparatus according to claim 5, wherein the first interval is less than or equal to 21 mm.

7. The foreign object detection apparatus according to claim 1, wherein, when the apparatus includes a plurality of laser transmitting parts and a plurality of laser receiving parts, the plurality of laser transmitting parts and the plurality of laser receiving parts are alternately arranged on the one side or the opposite side at a second interval.

8. The foreign object detection apparatus according to claim 1, wherein, when two pairs of laser transmitting parts and laser receiving parts are provided, each of the laser transmitting parts is arranged as facing each of the plurality of laser receiving parts.

9. The foreign object detection apparatus according to claim 8, wherein the laser moving part moves a first pair of the two pairs and a second pair of the two pairs in opposite directions.

10. The foreign object detection apparatus according to claim 1, wherein the laser receiving part includes a sub foreign object detection circuit for detecting a foreign object by using a cadmium sulfide (CdS) sensor.

11. The foreign object detection apparatus according to claim 10, wherein the sub foreign object detection circuit includes:
    a first resistor connected to an applied voltage ($V_{CC}$) at one end of the first resistor and connected to the CdS sensor at another end of the first resistor;
    the CdS sensor connected to the first resistor at one end of the CdS sensor and connected to a ground at another end of the CdS sensor; and
    a buffer receiving a voltage between the first resistor and the CdS sensor as an input and outputting an output based on the input at a constant voltage level.

12. The foreign object detection apparatus according to claim 11, wherein the first resistor is at least ten times smaller than an initial internal resistance of the CdS sensor, and at least ten times greater than an internal resistance of the CdS sensor varied by sensing the laser.

13. The foreign object detection apparatus according to claim 10, further comprising a foreign object detection determining part determining whether the foreign object exists or not by referring to an output of the sub foreign object detection circuit.

14. The foreign object detection apparatus according to claim 13, wherein the foreign object detection determining part determines that the foreign object is detected when the output of the sub foreign object detection circuit is equal to an applied voltage within a tolerable error range.

15. The foreign object detection apparatus according to claim 10, further comprising, when a plurality of laser receiving parts exist, an OR gate which receives outputs of sub foreign object detection circuits, each of which is included in each of the plurality of laser receiving parts, and outputs a result signal of an OR operation on the outputs of the sub foreign object detection circuits.

16. The foreign object detection apparatus according to claim 15, further comprising a foreign object detection determining part determining whether the foreign object exists or not by referring to the result signal from the OR gate.

17. The foreign object detection apparatus according to claim 16, wherein the foreign object detection determining part is a ground assembly (GA) controller, and controls an output power level of a GA coil included in the transmission pad according to a result of the determining whether the foreign object exists or not.

\* \* \* \* \*